United States Patent
Weber et al.

(10) Patent No.: US 11,698,321 B2
(45) Date of Patent: Jul. 11, 2023

(54) METHOD AND SET OF BALANCE WEIGHTS FOR BALANCING A ROTOR

(71) Applicant: MTU Aero Engines AG, Munich (DE)

(72) Inventors: Sebastian Weber, Munich (DE); Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 197 days.

(21) Appl. No.: 17/194,678

(22) Filed: Mar. 8, 2021

(65) Prior Publication Data

US 2021/0285838 A1 Sep. 16, 2021

(30) Foreign Application Priority Data

Mar. 10, 2020 (DE) ...................... 10 2020 203 018.9

(51) Int. Cl.
*G01M 1/32* (2006.01)
*F16F 15/32* (2006.01)

(52) U.S. Cl.
CPC ............... *G01M 1/32* (2013.01); *F16F 15/32* (2013.01)

(58) Field of Classification Search
CPC .................................. G01M 1/32; F16F 15/32
See application file for complete search history.

(56) References Cited

U.S. PATENT DOCUMENTS

| | | | |
|---|---|---|---|
| 6,082,186 A * | 7/2000 | Detwiler | F16F 15/322 73/66 |
| 6,471,453 B1 | 10/2002 | Winebrenner | |
| 6,890,038 B1 * | 5/2005 | Lucchesi | F16F 15/324 301/5.21 |
| 2005/0013403 A1 * | 1/2005 | Reznicek | G01M 1/32 378/15 |
| 2008/0156609 A1 * | 7/2008 | Barron | F16D 43/18 192/105 BA |
| 2014/0007414 A1 * | 1/2014 | Muth | H02K 15/165 29/593 |
| 2015/0001046 A1 * | 1/2015 | Burgel | F16F 15/324 198/803.14 |

(Continued)

FOREIGN PATENT DOCUMENTS

| CA | 2709140 A1 | 1/2011 |
|---|---|---|
| DE | 4107950 A1 | 9/1992 |

(Continued)

OTHER PUBLICATIONS

Lingener, A., "Auswuchten—Theorie und Praxis," Verlag Technik GmbH, Berlin—Munich, ISBN 3-341-00927-2 394-0027-B, 1992.

*Primary Examiner* — Natalie Huls
(74) *Attorney, Agent, or Firm* — Hinckley, Allen & Snyder, LLP; David R. Josephs

(57) ABSTRACT

The invention relates to a method and a set of balance weights for balancing a rotor particularly of a turbomachine, on which a plurality of balance weights, which are distributed over the periphery, can be arranged for balancing an imbalance. A set of balance weights, in particular plate-shaped weights, with a predetermined number of groups of balance weights, is used for balancing the rotor. Each of the balance weights of every group of balance weights has an identical weight that is assigned to this group and a shape assigned to this group, which differs in basic shape and/or thickness of the balance weights from the balance weights of the other groups.

13 Claims, 2 Drawing Sheets

(56) References Cited

U.S. PATENT DOCUMENTS

Figure 2A:
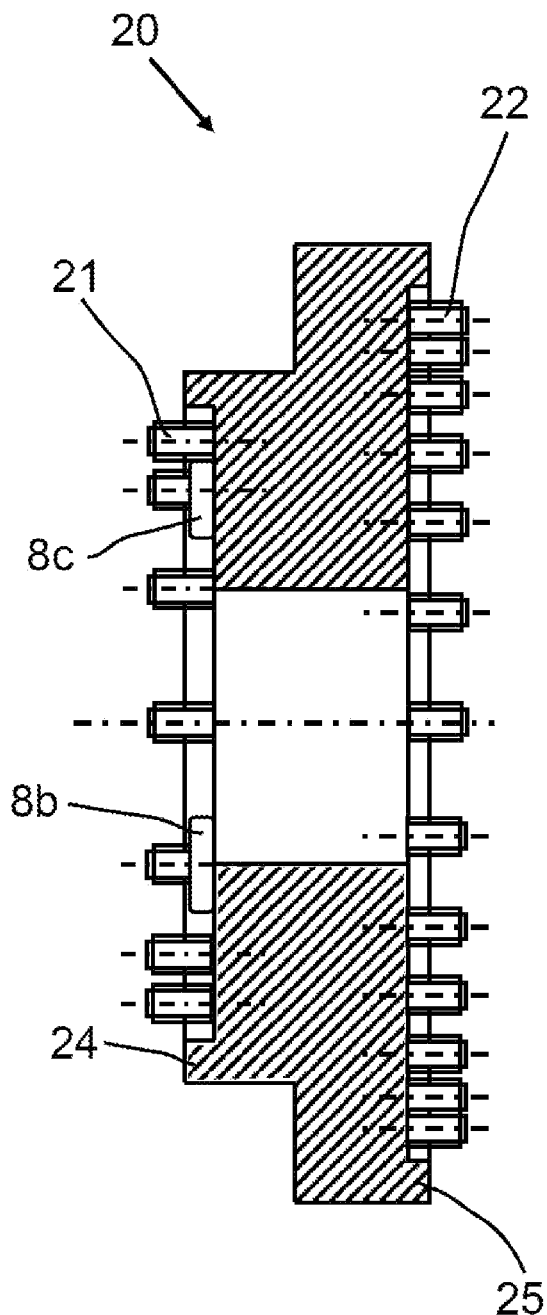

2015/0354360 A1    12/2015  LeStrat et al.
2020/0040764 A1 *   2/2020  Hugon .................... F01D 5/025

FOREIGN PATENT DOCUMENTS

| DE | 30300600 T2 |  | 12/2005 | |
|----|----|----|----|----|
| DE | 60300600 T2 | * | 12/2005 | ............. F01D 5/026 |
| DE | 102012105893 A1 |  | 1/2014 | |
| DE | 102018207432 A1 |  | 11/2019 | |
| EP | 1717481 A1 |  | 11/2006 | |
| EP | 2881591 A2 |  | 6/2015 | |
| EP | 3006667 A1 |  | 4/2016 | |
| EP | 2845999 B1 |  | 7/2017 | |

* cited by examiner

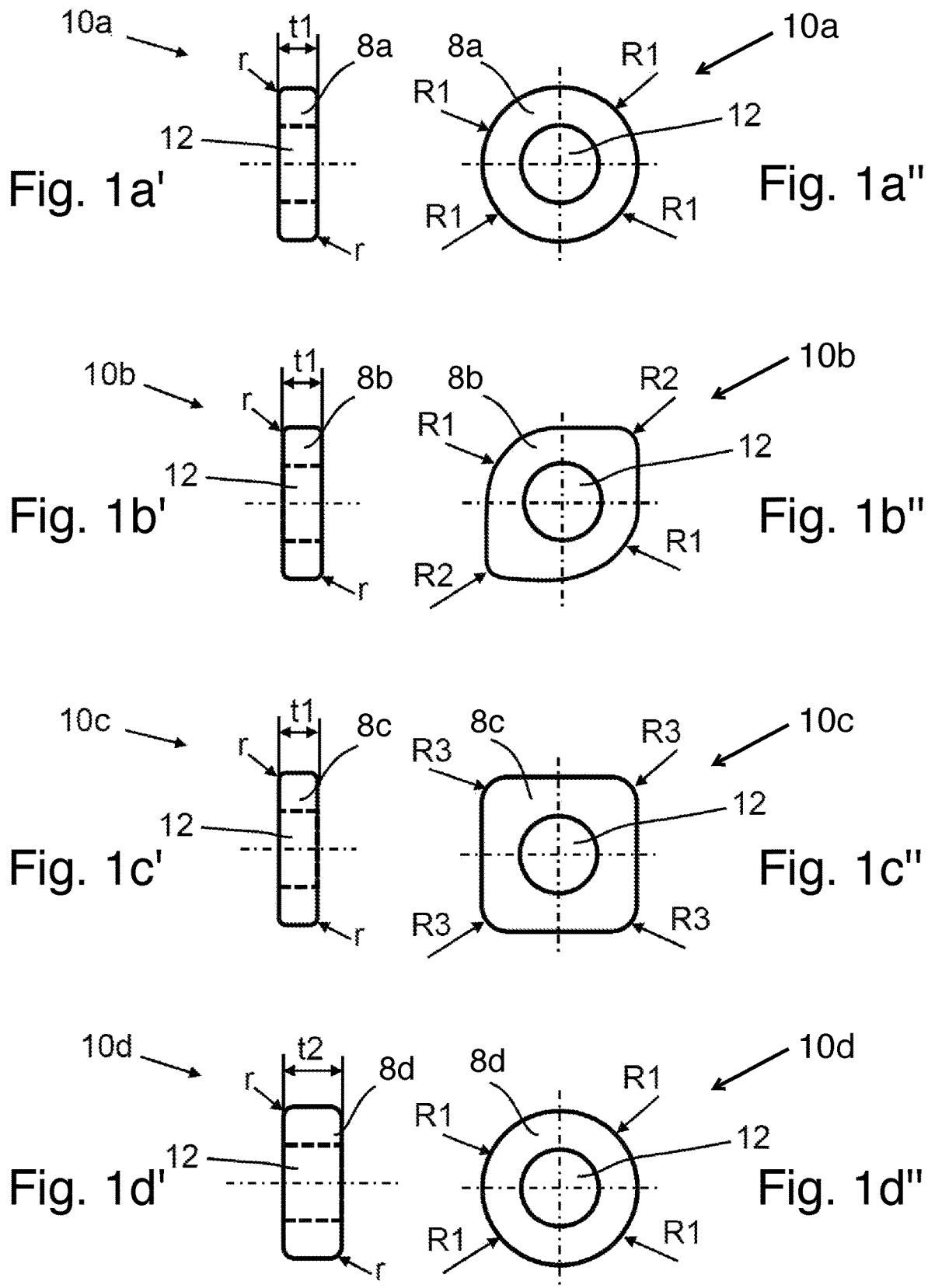

METHOD AND SET OF BALANCE WEIGHTS FOR BALANCING A ROTOR

BACKGROUND OF THE INVENTION

The invention relates to a method and a set of balance weights for balancing a rotor, particularly of a turbomachine, on which a plurality of balance weights, in particular weights near the edge or near the periphery and distributed over the periphery, can be arranged for balancing an imbalance, wherein a set of balance weights, in particular plate-shaped weights, with a predetermined number of groups of balance weights, are used for balancing the rotor.

Any rigid body rotating around an axis, such as a rotor, possesses an imbalance that can lead to vibrations, noise, and at high rotational speeds, in fact, to a breakdown of the rotor or its mount. In the case of too great an imbalance, an equilibration of the distribution of masses individually on the rotor is necessary. Methods and balance weights or sets of balance weights for the balancing of rotors are known. Thus, balance weights having uniform weight and a volume for processing, this volume being processed prior to arrangement on the rotor in order to adjust the desired weight, are known. Sets of balance weights frequently have a plurality of groups of balance weights having predominantly the same basic shape and which are formed larger or smaller or longer or shorter and/or thicker or thinner, due to their mass. In this case, it is often difficult to detect the weight of a balance weight at a glance or when found at positions on a rotor that are difficult to access. Frequently, the shapes of the balance weights are matched to the rotor to be balanced or to the fastening means provided thereon, so that these procedures are relatively labor-intensive to produce and are thus expensive. Also, such sets of balance weights are only suitable for balancing a particular rotor in each case.

SUMMARY OF THE INVENTION

Proceeding therefrom, an object of the present invention is to propose an improved method for balancing a rotor with a set of advantageously configured balance weights, a method which has a simplified and also cost-effective procedure. According to the invention, this is achieved by the teaching of the present invention. Advantageous embodiments of the invention are discussed in detail below.

According to a first aspect, for achieving the object, a method is proposed for balancing a rotor, particularly of a turbomachine, on which a plurality of balance weights, in particular weights near the edge or near the periphery and distributed over the periphery, can be arranged for equilibrating an imbalance. For balancing the rotor, a set of balance weights, in particular plate-shaped weights, having a predetermined number of groups of balance weights are used. The balance weights of each group of balance weights each have an identical weight that is assigned to this group, and a shape that is assigned to this group, which differs in basic shape and/or thickness of the balance weights from the balance weights of the other groups. For balancing the rotor, at least one balance weight from at least one group is arranged at a suitable position on the rotor, in particular near the edge or near the periphery.

The proposed method serves for balancing a rotor, particularly of a turbomachine, on which rotor a plurality of balance weights can be arranged, in particular near the edge or near the periphery and distributed over the periphery, for equilibrating an imbalance. The rotating (rotational) part of a machine or an assembly is designated as the rotor. For a suitable concentricity of a rotor, a uniform distribution of mass within the rotor body is required. In the presence of an unequal mass distribution, there is an "imbalance"; for "balancing", at least one balance weight is arranged on at least one suitable position, which is distanced as far as possible from the axis of rotation of the rotor for efficiency reasons, in order to equilibrate the imbalance and to produce a concentricity of the rotor.

In the proposed method, for balancing the rotor, a set of balance weights, in particular plate-shaped weights, having a predetermined number of groups of balance weights, is used. Each group of balance weights contains identical balance weights, whose shape and weight correspond, and these weights are assigned to the particular group, so that the weight of a balance weight can be easily detected based on its shape and therefore assignment to a particular group. Further, the balance weights are particularly plate-shaped, whereby a simple and cost-effective production is possible, for example, from sections of sheet metal. Understood as "plate-shaped" in the context of the present invention, is an essentially flat configuration, whose two large surfaces that lie essentially opposite to one another are essentially planar. The shape or basic shape of a balance weight in the context of the present invention is understood to be the outline of a particularly plate-shaped balance weight, in particular the shape of an outline of a section through the balance weight parallel to the plane of the plate shape or plate plane. The balance weights of the different groups can be easily detected with respect to shape and/or thickness, and particularly also with respect to their belonging to a particular group.

The balance weights of the set, in particular all the balance weights of the set and/or all the balance weights that are used for balancing the rotor, may be plane-parallel plates, each of which comprises, in particular, precisely only one through-opening, e.g. one through-borehole, for passage of and fastening by means of a bolt, such as a screw and/or a pin.

For balancing the rotor, at least one balance weight from at least one group is arranged at a suitable position on the rotor, in particular near the edge or near the periphery. The position for arranging at least one balance weight is determined in this case in connection with the groups of balance weights that are contained in the set that is employed. For arranging the balance weights, a rotor may have positions provided, on which, for example, shape-locking elements or fastening elements are provided, such as screw connections or devices for arranging fastening elements, such as, for example, recesses or threaded drilled holes. For arranging balance weights on a rotor of this kind, correspondingly, predetermined positions can also be considered when establishing a suitable position.

The proposed method for balancing makes possible a simple and cost-effective balancing of a rotor by means of a set of balance weights, which differ with respect to shape and/or thickness of the different groups of balance weights, in order to be able to easily recognize the group to which they belong and thus to detect their weight.

In one embodiment of the method for balancing a rotor, at least two balance weights are arranged on the rotor, in particular near the edge or near the periphery at suitable positions that are spread apart from one another, in order to balance the rotor. Such an arrangement is then usually selected when no precisely matching balance weight is provided. In this embodiment, the at least two balance weights are arranged, so that the individual weights are equilibrated in the desired way. In this case, for the most part, one balance weight is usually arranged on the rotor near the periphery and a different balance weight is particularly arranged diametrically opposite thereto for this purpose. In another exemplary embodiment, which is called a Y arrangement, two additional balance weights are arranged approximately diametrically on the rotor, in particular, spaced apart from one another.

In one embodiment of the method for balancing a rotor according to the present invention, the predetermined number of groups of balance weights of the set lies in a range from three to twelve balance weights, in particular in a range from three to nine groups, in particular in a range from five to eight groups, and particularly amounts to seven groups. The predetermined number of groups of balance weights of a set particularly amounts to three, four, five, six, seven, eight, nine, ten, eleven, or twelve. A suitable number of groups of balance weights of the set results, in particular depending on the achievable manufacturing precision and/or on possible positions where balance weights can be fastened on the rotor, particularly near the edge or near the periphery.

In one embodiment of the method for balancing a rotor, the balance weights are arranged on the rotor in different alignments corresponding to their particular shape. In this embodiment, each of the individual balance weights of one group is configured in such a way that it can be positioned in an arrangement on the rotor in a position different from the balance weights of other groups. This different positioning can also be made in connection with projections, recesses or the like, which are formed on the rotor. This embodiment of the method is helpful, in particular, in cases of application in which there is limited accessibility, and particularly also where there is limited visual accessibility, to positions where balance weights are arranged on the rotor. Thus, this embodiment makes possible a simpler positioning of balance weights and also a visual and/or haptic detection, in particular, of which (weight) group a balance weight belongs, which is based on the configuration thereof.

In one embodiment of the method, the rotor has a plurality of screw connections, which are arranged distributed over the periphery in the edge region in particular, and at least one balance weight can be arranged on each of these connections. In this case, the screw connections, which usually primarily fulfill another function on the rotor, are configured so that at least one balance weight can be arranged on each of these connections. In this way, a simple arrangement of balance weights on the screw connections is possible for the objective of balancing the rotor, without further, additional devices on the rotor being necessary. In this case, in the edge region, it is understood that the screw connections are arranged on the rotor in a region that is found radially further outside, since a greater mass equilibration can be achieved with balance weights that are arranged further outside radially. For example, the rotor can have at least two groups of screw connections, each of which is distributed concentrically on the rotor, and, in particular, in two planes that are axially distanced, and on each of which at least one balance weight can be arranged. A plurality of possibilities for fastening balance weights on the rotor simplifies a precise balancing of a rotor and also simultaneously makes possible the use of a set of balance weights with a smaller number of groups of balance weights.

In a second aspect, for achieving the object, a set of balance weights for balancing a rotor, in particular of a turbomachine, is proposed, wherein the balancing of the rotor can be conducted, in particular, corresponding to the previously described method. The proposed set of balance weights has several groups of balance weights, in particular, plate-shaped balance weights. In this case, each of the balance weights of every group of balance weights has an identical weight that is assigned to this group and a shape assigned to this group, which differs in basic shape and/or thickness of the balance weights from the balance weights of the other groups.

The proposed set has a predetermined number of groups of balance weights, in particular, plate-shaped weights. As has already been previously described in connection with the method, each group of balance weights contains identical balance weights with matching shape and weight. In this way, the weight of the balance weights can be easily detected based on shape as well as assignment to a particular group. For example, each of the balance weights has a weight that lies in the range of one gram to six grams, by which, in particular, a fine balancing is possible. Further, the balance weights are particularly formed plate-shaped, in order to make possible a simple and cost-effective production, for example, from sections of sheet metal. As already discussed, the shape of a balance weight in the context of the invention is understood to be the outline of a balance weight, which is plate-shaped in particular. In order to make possible a fastening on the rotor, a balance weight can have, for example, one or more through-openings, such as drilled holes, or one or more other suitable engagement or form-fitting devices or other suitable devices for fastening means. Further, the balance weights of the different groups differ with respect to their basic shape and/or thickness, so that their assignment to a group can be easily recognized.

In one embodiment of the set of balance weights, the predetermined number of groups of balance weights of the set lies in a range of three to twelve balance weights, in particular in a range from three to nine groups, in particular in a range from five to eight groups, and particularly amounts to seven groups. The predetermined number of groups of balance weights particularly amounts to three, four, five, six, seven, eight, nine, ten, eleven, or twelve. As has already been indicated for the method, a suitable number of groups of balance weights of the set is particularly dependent on the achievable manufacturing precision and/or on possible positions where balance weights can be fastened to the rotor, particularly near the edge or near the periphery.

In one embodiment of the set of balance weights, the number of groups of balance weights with different shape is smaller than the total number of groups of balance weights. The balance weights of at least two groups in this case are distinguished by their thickness, wherein a different weight of the identically shaped balance weights results due to the different thickness based on the larger or smaller mass.

In the case of one embodiment of the set of balance weights, the balance weights of at least two groups have the identical shape and a different thickness. In this way, at least two groups of balance weights have the same shape, but a different weight that is based on the different thickness.

In one embodiment of the set of balance weights, the basic shape of at least one group of balance weights represents a square with rounded corners. In this case, depending on the size of the radii of the rounded corners, the shapes can be clearly distinguished from one another by their outer appearance. For example, one balance weight has a circular configuration, since each of its four radii corresponds to half a side length of the underlying square. In contrast, if the four radii of a balance weight have clearly smaller radii than half the side length of the square, then the balance weight has a clearly square shape.

The balance weights of the set, in particular all the balance weights of the set and/or all the balance weights that are used for balancing the rotor, may have a comparatively simple basic shape, in particular a circular shape, an eye shape, an elliptical shape, and/or a square shape, in particular with rounded corners in each case.

The basic shape of one or more of the balance weights, in particular of all the balance weights of the set, and/or of all the balance weights that are used for balancing the rotor, may be rotationally symmetrical (circular) through the center of gravity of the balance weight relative to a rotation about an axis perpendicular to the plane of the plate, or may have a two-fold (e.g., eye shape or ellipse), three-fold (e.g., equilateral triangle) or four-fold (e.g., square) symmetry.

Additionally or alternatively, one or more of the balance weights, in particular all the balance weights of the set, and/or all the balance weights that are used for balancing the rotor can be mirror-symmetrical relative to a plane parallel to the plate shape or to the plate plane.

Preferably, in one or more of the balance weights, in particular in all the balance weights of the set, and/or in all the balance weights that are used for balancing the rotor, the center point of the through-opening and the center of gravity of the balance weight, in particular each balance weight of the set and/or each balance weight that is used for balancing the rotor, coincide or essentially coincide. For example, the deviation between the central point and the center of gravity can amount to at most double the thickness, the thickness, or half the thickness of the balance weight.

The balance weights therefore can have a comparatively simple configuration that can reliably prevent an erroneous mounting, and a blind mounting on difficult-to-access sites without viewing them can be essentially facilitated.

The set of balance weights, in particular, can comprise all the balance weights that are used for balancing the rotor.

The weight gradation or weight differences within the set of balance weights can be achieved exclusively by different basic shapes of the balance weights and/or by different thicknesses of the balance weights, in particular in the case of the same material.

By a visual assignment of basic shape and/or thickness to weight, a confusion can be effectively prevented during the balancing and the mounting can be facilitated.

Further, by varying the size of the basic square shape or at least the size of a radius, a matching of the shape of the balance weights to projections, recesses, or the like, which are formed on the rotor, is possible, so that the correct arrangement of a balance weight can be facilitated by means of alignment predefined by the shaping.

In one embodiment of this set of balance weights, at least two corners of the group of balance weights with basic square shape and rounded corners have a different radius. If, for example, each of two opposite-lying corners have a larger and/or smaller radius than the other two opposite-lying corners, then the shape of the weight appears eye-shaped, for example. An eye-shaped balance weight, for example, is visually and also haptically clearly perceived differently than a circular or square balance weight. In this way, the set of balance weights can have balance weights that can be distinguished from one another easily both visually as well as haptically by varying the radii of a balance weight. By a variation in the radii of the rounded corners, a plurality of different balance weights is possible, which balance weights have different weights that can be narrowly graded, but also can be easily distinguished from one another.

BRIEF DESCRIPTION OF THE DRAWING FIGURES

Figure 2B:
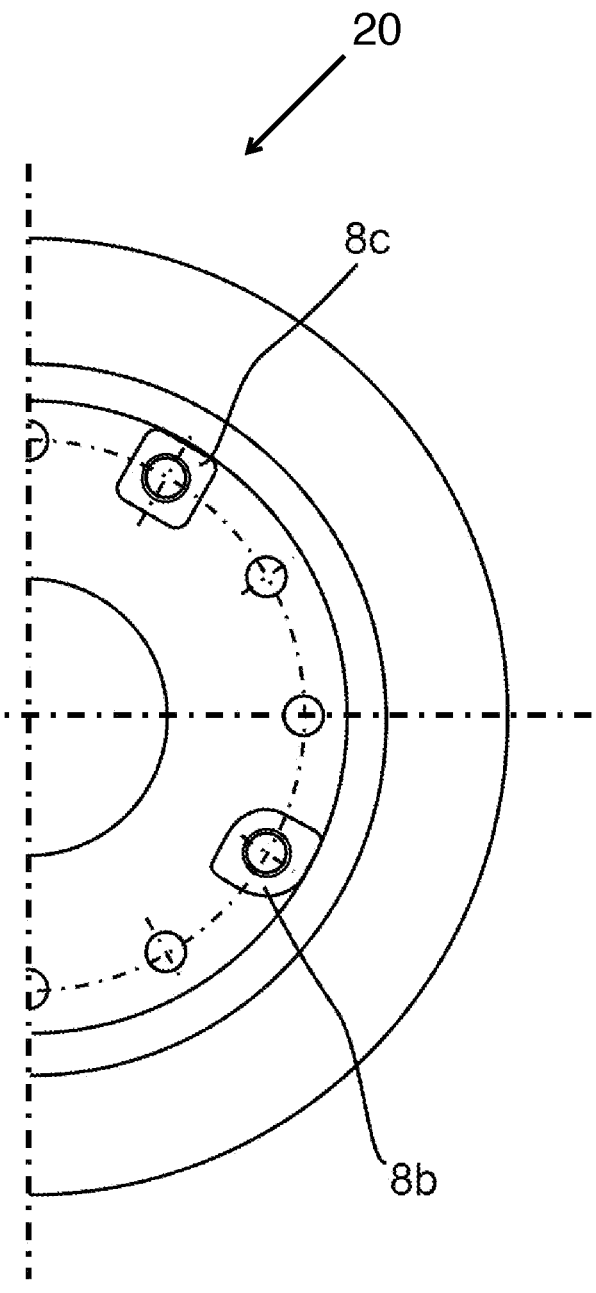

Further features, advantages and application possibilities of the invention result from the following description in connection with the figures. Herein:

FIGS. 1$a'$, 1$a'''$, 1$b'$, 1$b'''$, 1$c'$, 1$c'''$, 1$d'$ and 1$d'''$ show a schematic representation of an exemplary embodiment of a set of balance weights according to the invention; and FIG. 2A shows a cross-sectional view of a rotor on which exemplary balance weights according to the invention are arranged; and FIG. 2B shows a front view thereof.

DESCRIPTION OF THE INVENTION

FIGS. 1$a'$, 1$a'''$, 1$b'$, 1$b'''$, 1$c'$, 1$c'''$, 1$d'$ and 1$d'''$ each show a schematic representation in side and front views of an exemplary embodiment of a set of balance weights for balancing a rotor according to the invention. The set that is shown by way of example is particularly suitable for balancing a rotor of a turbomachine, in particular with the method according to the invention. The set of balance weights 8$a$ to 8$d$, which are shown in FIGS. 1$a'$, 1$a'''$, 1$b'$, 1$b'''$, 1$c'$, 1$c'''$, 1$d'$ and 1$d'''$ by way of example have four groups 10$a$ to 10$d$ of exemplary plate-shaped balance weights 8$a$, 8$b$, 8$c$ and 8$d$. Each of the balance weights 8$a$ to 8$d$ of every group 10$a$ to 10$d$ of balance weights has an identical weight that is assigned to the particular group 10$a$ to 10$d$, as well as a shape assigned to the particular group 10$a$ to 10$d$. In this case, each of the balance weights 8$a$ to 8$d$ of a group 10$a$ to 10$d$ is distinguished by the basic shape and/or thickness t1, t2 of the balance weights 8$a$ to 8$d$ from the balance weights 8$a$ to 8$d$ of the other groups 10$a$ to 10$d$. All the balance weights 8$a$ to 8$d$ of the exemplary set of balance weights are produced from the same material and have an edge rounding r on their peripheral edges.

The balance weight 8$a$ of a first group 10$a$, which is shown in FIGS. 1$a'$ and 1$a'''$, has four merging radii R1 of the same size, so that the balance weight 8$a$ has a circular outline or a circular shape. A through-opening 12, e.g., a through-borehole, which serves for fastening the balance weight 8$a$ to a rotor, is arranged centrally in the balance weight 8$a$. The balance weight 8$a$ further has a thickness t1.

The balance weight 8$b$ of a second group 10$b$, which is shown in FIGS. 1$b'$ and 1$b'''$, has a basic square shape, wherein each of two opposite-lying radii R1 and R2 are of different size. The balance weight 8$b$ correspondingly has an eye-shaped outline or an eye shape. Also, a central through-opening 12, e.g., a through-borehole, which serves for fastening the balance weight 8$b$ to a rotor, is provided in the balance weight 8$b$. The balance weight 8$b$ also has a thickness t1. The thickness t1 corresponds to the thickness t1 of the balance weight 8$a$ shown in FIGS. 1$a'$ and 1$a'''$. Based on the smaller radius R2, which amounts to approximately one-third of the radius R1, the balance weight 8$b$ has a greater mass and thus weighs more than the balance weight 8$a$.

In addition, the balance weight 8$c$ of a third group 10$c$, which is shown in FIGS. 1$c'$ and 1$c'''$, has a basic square shape. All four radii R3 of the balance weight 8$c$ are of equal size and amount to approximately one-fifth of a side length of the basic square shape. The balance weight 8$c$ correspondingly has a square outline with rounded corners or a shape of this kind. A central through-opening 12, e.g., a through-borehole, which serves for fastening the balance weight 8$c$ to a rotor, is also provided in the balance weight 8$c$. Further, the balance weight 8$c$ also has a thickness t1, which corresponds to the thickness t1 of the balance weights 8*a* and 8*b*. Based on the radii R3, which are smaller in relation to the radii R1, the balance weight 8*c* has a greater mass and thus weighs more than the balance weights 8*a* and 8*b*.

The outline or the shape of the balance weight 8*d* of a fourth group 10*d* of balance weights, which is shown in FIGS. 1*d'* and 1*d"*, corresponds to the outline or the shape of the balance weight 8*a*, which is shown in FIGS. 1*a'* and 1*a"*. Correspondingly, the balance weight 8*d* has four merging radii R1 of the same size, so that the balance weight 8*d* has a circular outline or a circular shape. A through-opening 12, e.g., a through-borehole, which serves for fastening the balance weight 8*d* to a rotor, is arranged centrally in the balance weight 8*d*. In contrast to the balance weight 8*a*, the balance weight 8*d* has a thickness t2 that is greater than the thickness t1 of the balance weight 8*a*. Based on the greater thickness t2, the balance weight 8*d* has a greater mass and thus weighs more than the balance weight 8*a*. Since the thickness t2 is approximately one-third greater than the thickness t1, the mass and therefore also the weight of the balance weight 8*d* is also greater than the mass and the weight of the balance weights 8*b* and 8*c*. Correspondingly, the balance weights 8*a* to 8*d* of the groups 10*a* to 10*d* of the exemplary set of balance weights according to the invention, which are shown in FIGS. 1*a'*, 1*a"*, 1*b'*, 1*b"*, 1*c'*, 1*c"*, 1*d'* and 1*d"* have a weight that increases sequentially.

FIGS. 2A and 2B show a schematic representation of an exemplary rotor 20, on which two balance weights 8*b* and 8*c* are arranged. In FIG. 2A, the rotor 20 is shown in a sectional representation; in FIG. 2B, the right half of a front view of the rotor 20 is shown. A plurality of screw connections 21, 22 are arranged uniformly distributed over the periphery on both sides of the rotor 20, on a concentrically arranged circle line, and balance weights for equilibrating an imbalance can also be arranged on these screw connections, in particular, distributed over the periphery on the rotor 20. In each case, the rotor has a shoulder 24, 25, radially running concentrically around the screw connections 21, 22, which are arranged on both sides of the rotor 20. In the drawing, the nuts of the screw connections were omitted for reasons of clarity. As can be seen in FIGS. 2A and 2B, the balance weight 8*c* is arranged on a screw connection 21 in the upper region of the rotor 20. In this case, it is aligned on the screw connection 21 so that it is applied to the shoulder 24. Based on the size of the basic square shape of the balance weight 8*c*, the latter can be arranged on the screw connection 21 only in this alignment. The eye-shaped balance weight 8*b* is arranged on a screw connection 21 in the lower region of the rotor 20.

What is claimed is:

1. A method for balancing a rotor of a turbomachine, on which a plurality of balance weights, which are distributed over the periphery, are arranged for equilibrating an imbalance, wherein, a set of plate-shaped balance weights with a predetermined number of groups of balance weights, is used for balancing the rotor, wherein each of the balance weights of every group of balance weights has an identical weight that is assigned to this group and a shape assigned to this group, which differs in basic shape and/or thickness of the balance weights from the balance weights of the other groups, wherein, for balancing the rotor, at least one balance weight from at least one group is arranged at a suitable position on the rotor near the edge or near the periphery thereof, wherein each of the plurality of balance weights have a single through-opening arranged centrally therein.

2. The method for balancing a rotor according to claim 1, wherein, for balancing the rotor, at least two balance weights are arranged at suitable positions on the rotor, which are distanced from one another near the edge or near the periphery thereof.

3. The method for balancing a rotor according to claim 1, wherein the predetermined number of groups of balance weights of the set lies in a range of three to twelve groups of balance weights.

4. The method for balancing a rotor according to claim 1, wherein the balance weights are arranged on the rotor and are aligned differently corresponding to their particular shape.

5. The method for balancing a rotor according to claim 1, wherein the rotor has a plurality of screw connections, which are arranged over the periphery in the edge region and at least one balance weight is arranged on each of these screw connections.

6. The method for balancing a rotor according to claim 5, wherein the rotor has at least two groups of screw connections, each of which is arranged concentrically over the periphery and in two planes that are axially distanced on the rotor.

7. A set of balance weights for use in the method of balancing a rotor according to claim 1, wherein the set has a plurality of groups of plate-shaped balance weights, wherein each of the balance weights of every group of balance weights has an identical weight that is assigned to this group and a shape assigned to this group, which differs in basic shape and/or thickness of the balance weights from the balance weights of the other groups.

8. The set of balance weights for use in the method of balancing a rotor according to claim 7, wherein the predetermined number of groups of balance weights of the set lies in a range of three to twelve groups.

9. The set of balance weights for use in the method of balancing a rotor according to claim 7, wherein the number of groups of balance weights with different shape is smaller than the total number of groups of balance weights.

10. The set of balance weights for use in the method of balancing a rotor according to claim 7, wherein the balance weights from at least two groups of balance weights have the identical shape and a different thickness.

11. The set of balance weights for use in the method of balancing a rotor according to claim 7, wherein the basic shape of at least one group of balance weights is a square with rounded corners.

12. The set of balance weights for use in the method of balancing a rotor according to claim 11, wherein at least two corners of the group of balance weights with basic square shape and rounded corners have a different radius.

13. The set of balance weights for use in the method of balancing a rotor according to claim 7, wherein the balance weights have an edge rounding at their peripheral edges.

* * * * *